(12) United States Patent
Paquet et al.

(10) Patent No.: US 6,336,356 B1
(45) Date of Patent: Jan. 8, 2002

(54) COMPACT LEAK DETECTOR

(75) Inventors: Jean Marc Paquet, Annecy le Vieux; Gilles Baret, Annecy, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/409,342

(22) Filed: Sep. 30, 1999

(30) Foreign Application Priority Data

Oct. 1, 1998 (FR) .............................................. 98 12290

(51) Int. Cl.$^7$ ................................................ G01M 3/04
(52) U.S. Cl. ........................................................ 73/40.7
(58) Field of Search .................................. 73/40.7, 40

(56) References Cited

U.S. PATENT DOCUMENTS

| 3,592,048 A | 7/1971 | Maurice et al. ............. 73/40.7 |
|---|---|---|
| 3,714,421 A | 1/1973 | Josias et al. ................ 250/381 |
| 4,399,690 A | 8/1983 | Fruzzetti |
| 4,593,530 A | 6/1986 | Longsworth ................. 62/55.5 |
| 4,761,553 A | 8/1988 | Juravic, Jr. |
| 5,107,697 A | 4/1992 | Tallon et al. ................. 73/40.7 |
| 5,116,196 A | 5/1992 | Baret et al. ................... 415/89 |
| 5,134,877 A | 8/1992 | Gilles et al. ................. 73/40.7 |
| 5,297,422 A | 3/1994 | Baret .......................... 73/40.7 |
| 5,341,671 A | 8/1994 | Baret et al. .................. 73/40.7 |
| 5,349,846 A | 9/1994 | Martinez et al. ............... 73/40 |
| 5,363,689 A | 11/1994 | Hoffmann et al. .......... 73/1.17 |
| 5,440,918 A | 8/1995 | Oster ...................... 73/40.5 R |
| 5,537,857 A | 7/1996 | Grosse Bley ................ 73/40.7 |
| 5,756,881 A | 5/1998 | Stockli et al. ............... 73/40.7 |
| 6,014,892 A | 1/2000 | Baret et al. .................. 73/40.7 |

*Primary Examiner*—Hezron Williams
*Assistant Examiner*—Jay L. Politzer
(74) *Attorney, Agent, or Firm*—Sughrue Mion, PLLC

(57) ABSTRACT

The invention relates to a leak detector comprising a primary pump unit, a secondary pump unit having at least one secondary pump, a gas analyzer, a test module, a calibration module, a delivery module of the secondary pump unit, valves, and link segments. In the invention the leak detector includes a one-piece main block provided with spaces making it possible to integrate at least some of the component elements of the leak detector.

9 Claims, 4 Drawing Sheets

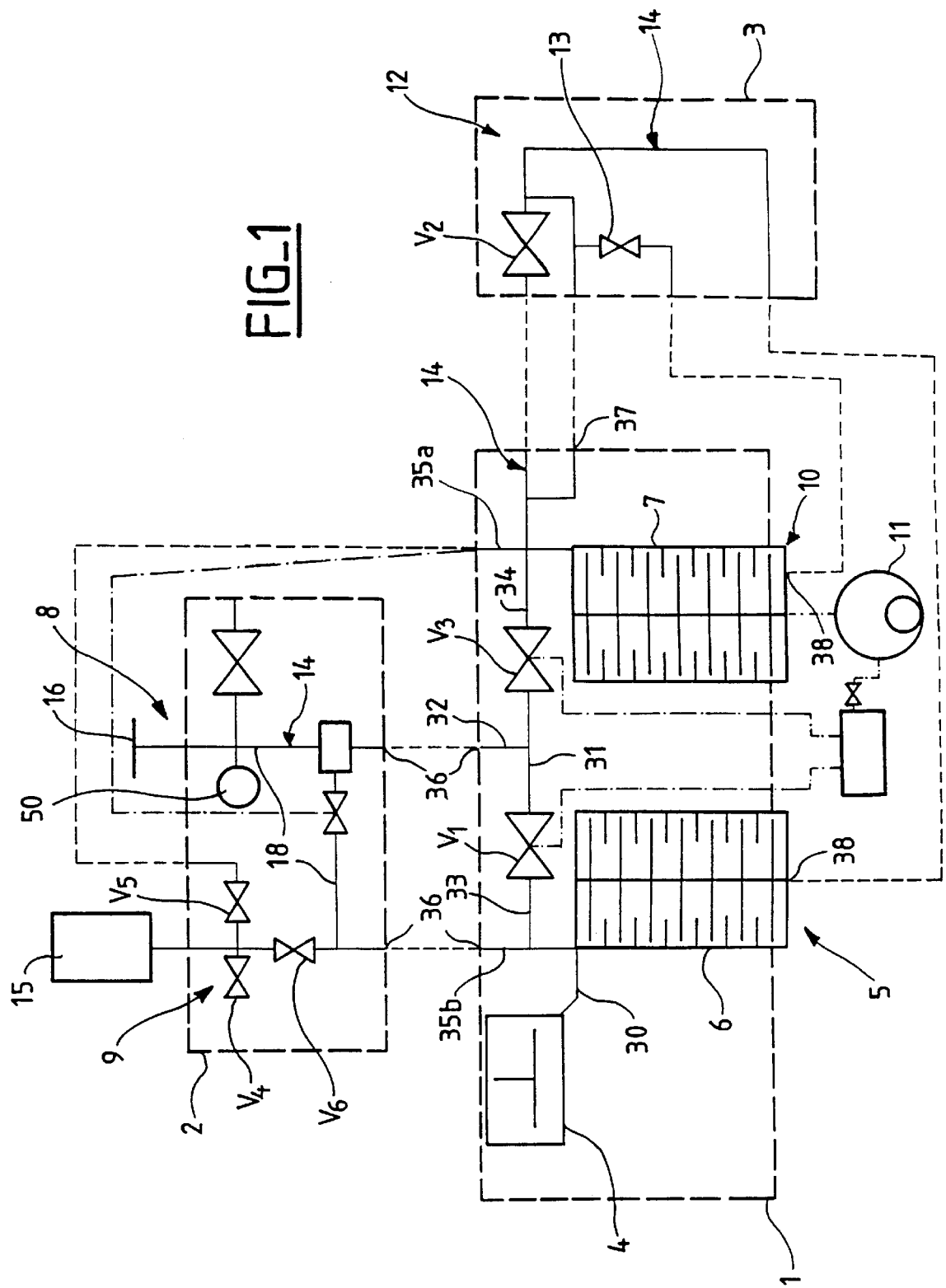

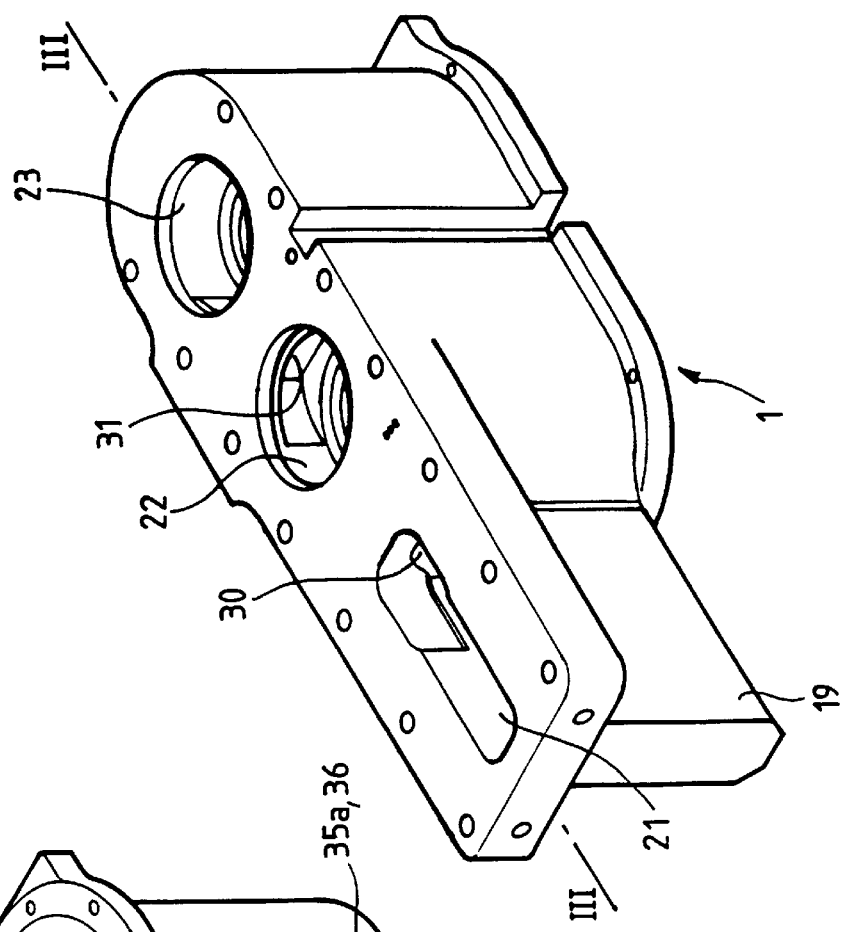
FIG_2B
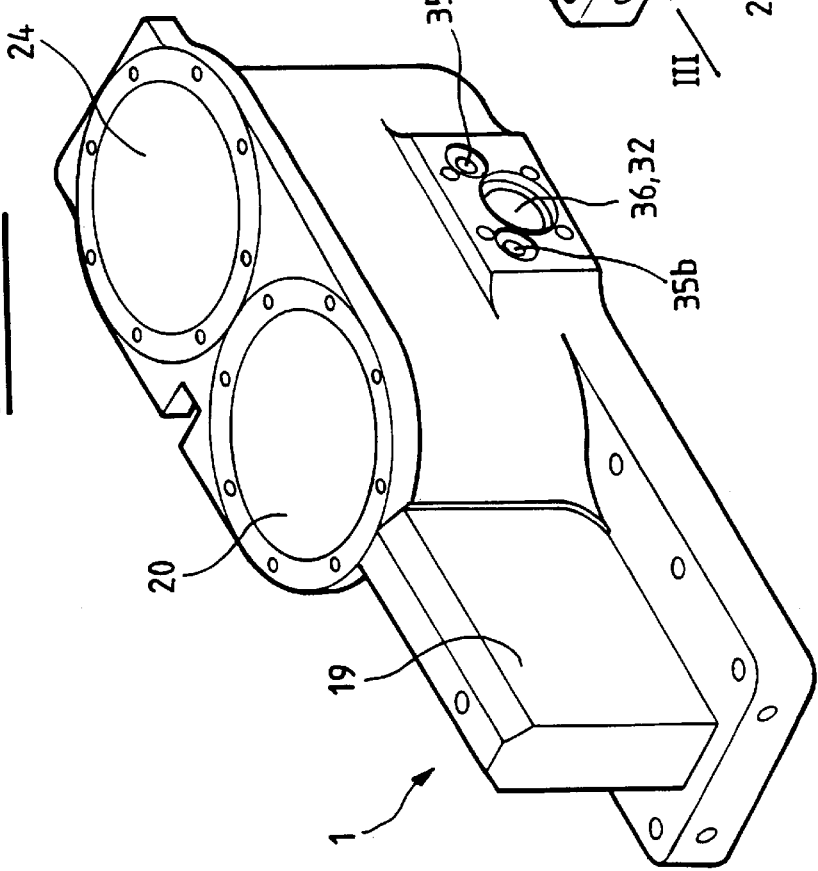
FIG_2A

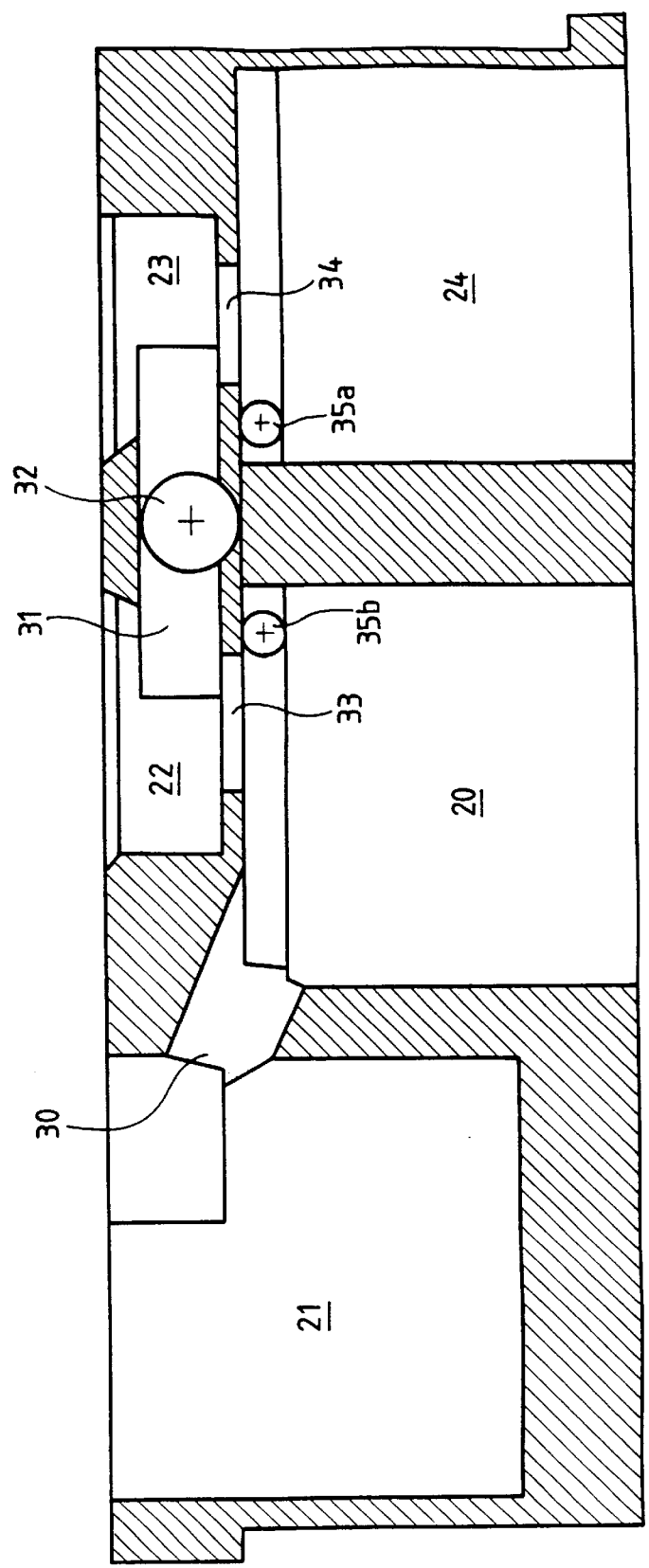
FIG_3

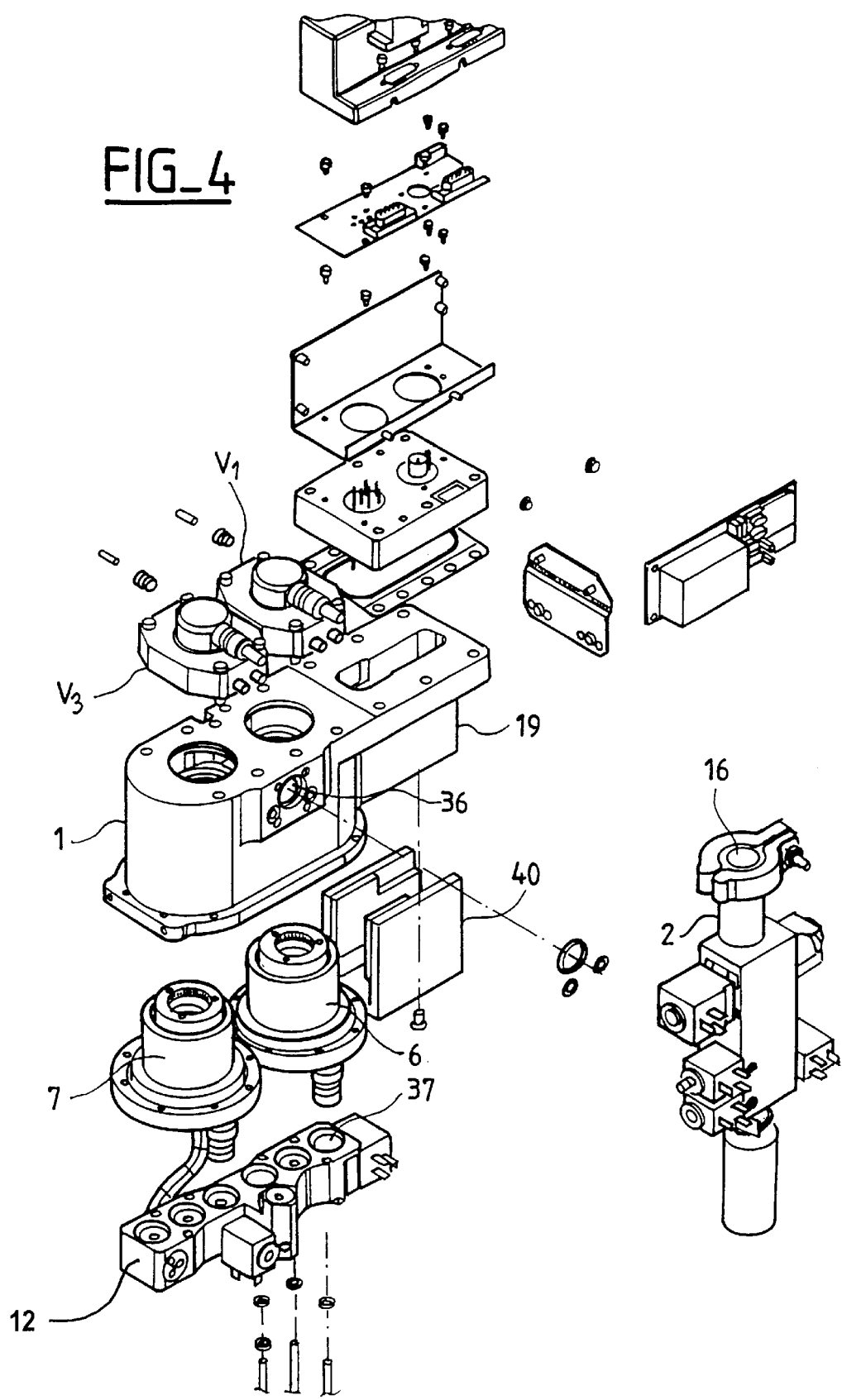
FIG_4

COMPACT LEAK DETECTOR

BACKGROUND OF THE INVENTION

A leak detector is a complex machine made up of many interconnected elements. The main component elements of a leak detector are as follows: a primary pump unit, a secondary pump unit, a gas analyzer, and a set of valves and of pressure-measuring gauges.

These elements are interconnected via link segments.

The link segments that are currently used are corrugated tubes or the like that have very good intrinsic gastightness, and mechanical connection devices between said tubes and the component elements of the leak detector, which devices also offer good gastightness. However, it is necessary for the gastightness of the link segments to be tested thoroughly once they have been installed. Such testing is lengthy and considerably increases the time required for manufacturing leak detectors.

Furthermore, at least minimum distances between said component elements of the leak detector are necessary in order to enable the non-integral link segments to be installed. As a result, the compactness of such leak detectors is limited, and the performance of such a leak detector is limited by head loss in the non-integral link segments.

OBJECTS AND SUMMARY OF THE INVENTION

An object of the present invention is to provide a leak detector in which the number of non-integral link segments is reduced significantly, thereby making it possible to increase the reliability of the gastightness of the apparatus, as well as to reduce its head loss and thus to increase its performance.

Another object of the present invention is to provide a leak detector whose compactness is improved considerably.

To these ends, the invention provides a leak detector comprising:

a primary pump unit;

a secondary pump unit having at least one secondary pump;

a gas analyzer;

a test module;

a calibration module;

a delivery module of the secondary pump unit; valves; and link segments.

In the invention, the leak detector includes a one-piece main mounting block provided with spaces making it possible to integrate at least some of the component elements of the leak detector.

In the invention, the one-piece main mounting block is provided with at least:

a bore forming the casing for the stator of said secondary pump;

a space forming a casing for the gas analyzer;

bored ducts forming some of said link segments and some of the casings of said valves; and block inlets and outlets making it possible to connect the integrated components to the other component elements of the leak detector.

In an embodiment of the invention, the secondary pump unit comprises a turbomolecular pump that has a stator casing constituted by a bore in said main mounting block.

The primary pump unit comprises a turbomolecular pump in series with a primary pump, said turbomolecular pump having a stator casing constituted by a bore in said main mounting block.

The main mounting block advantageously has a non-magnetic thin portion in which a space is provided for receiving the gas analyzer which is of the magnetic mass spectrometer type, the magnet of the mass spectrometer being integrated by straddling said thin portion.

In an embodiment of the invention, the leak detector includes:

a one-piece delivery block provided with:

bored ducts forming some of said link segments and some of the casings of said valves of the delivery module of the secondary pump unit; and block inlets and outlets coming into register with the corresponding block outlets and inlets of the main block;

and/or a one-piece test and calibration mounting block provided with:

bored ducts forming some of said link segments and some of the casings of said valves of the test module and of the calibration module; and block inlets and outlets coming into register with the corresponding block outlets and inlets of the main block.

The one-piece mounting blocks may be made by any known means, in particular by machining or by molding.

A first advantage of the present invention results from the some or even all of the link segments being integrated in the one-piece mounting block(s).

Another advantage of the present invention, following on from the preceding advantage, results from the main component elements of the leak detector being integrated in bores or spaces provided for this purpose in the one-piece blocks, thereby considerably reducing the spaces between said elements, and thus increasing the compactness and the performance of the leak detector.

BRIEF DESCRIPTION OF THE DRAWINGS

Other advantages and characteristics of the present invention appear from the following description given with reference to the accompanying drawings, in which:

FIG. 1 is a diagram summarizing the principle of an embodiment of a leak detector of the invention;

FIGS. 2A and 2B are diagrammatic views of a main mounting block of the embodiment of the invention;

FIG. 3 is a diagrammatic view in section on line III—III of the view in FIG. 2A; and FIG. 4 is an exploded diagrammatic view of the embodiment of a leak detector of the invention.

MORE DETAILED DESCRIPTION

The present invention relates to a compact leak detector. More particularly, the present invention relates to a compact leak detector having a gas analyzer. The operating principle of such a detector is widely known. A diagram summarizing the principle of a leak detector of the invention is shown in FIG. 1.

A leak detector having a gas analyzer comprises the following component elements:

a gas analyzer 4;

a secondary pump unit 5 providing a hard vacuum at the gas analyzer;

a test module 8 suitable for being connected to the testpiece;

a calibration module 9 making it possible to calibrate the gas analyzer; and a primary pump unit 10 for maintaining the vacuum in the secondary pump unit.

All these component elements of the leak detector are connected together via link segments 14.

In the invention, at least some of the component elements of the leak detector are integrated in a one-piece main mounting block 1 provided with integration means 20, ..., 30.

The invention is described on the basis of the summary diagram given in FIG. 1. However, the present invention is not limited to the embodiment proposed in this summary diagram.

The secondary pump unit 5 comprises at least one pump 6, e.g. of the turbomolecular type, whose suction inlet is connected firstly to a gas analyzer via link 30 and secondly, via a test valve $V_1$, to the test module 8. The delivery outlet of the pump 6 is connected to the suction inlet of the primary pump unit 10 via an isolation valve $V_2$ in a delivery module 12 of the secondary pump unit. The delivery module 12 of the secondary pump unit has valves $V_2$, 13.

The primary pump unit 10 comprises a pump 7, e.g. of the turbomolecular type, whose suction inlet is connected to the valve $V_2$ and, in parallel, to a pre-evacuation valve $V_3$. The valve $V_3$ is connected firstly to the test valve $V_1$ and secondly to the test module 8.

The delivery outlet of the pump 7 is connected to a primary pump 11 (which is a pump of any one of the following types: oil vane pump, diaphragm pump, multi-stage roots pump, scroll pump, screw pump, etc.)

The calibration module 9 is of the calibrated leak type. It comprises an enclosure 15 having a calibrated leak connected to ambient air via air-intake valves $V_4$, to the suction inlet of the pre-evacuation pump 7 via a pre-evacuation valve $V_5$, and to the gas analyzer via a detection valve $V_6$.

The test module 8 is provided with a test inlet 16 serving to be connected to the testpiece (not shown).

The gas analyzer is of the mass spectrometer type.

In the embodiment shown in FIGS. 2A to 2B and 3, the one-piece machined main mounting block 1 is provided with:

a bore 20 forming the casing for the stator of the turbomolecular pump 6 of the secondary pump unit 5;

a space 21 forming the casing for the gas analyzer;

the casings 22, 23 for the test isolation valve $V_1$, and for the pre-evacuation valve $V_3$ (these valves may advantageously be suction valves, the energy for driving the valves being provided by tapping from the primary pump, for example); and a bore 24 forming the casing for the stator of the turbomolecular pump 7 of the primary pump unit 10.

Some of the link segments are provided in the main mounting block 1:

the link segment 30 between the gas analyzer 4 and the suction inlet of the turbomolecular pump 6 of the secondary pump unit 5;

the link segment 31 between the test isolation valve $V_1$ and the pre-evacuation valve $V_3$;

the link segment 32 between the test module 8 and the test isolation and pre-evacuation valves $V_1$, $V_3$;

the link segment 33 between the test isolation valve $V_1$ and the suction inlet of the turbomolecular pump 6 of the secondary pump unit 5;

the link segment 34 between the pre-evacuation valve $V_3$ and the suction inlet of the turbomolecular pump 7 of the primary pump unit 10; and the link segment 35a between the calibration module 9 and the suction inlet of the turbomolecular pump 7 of the primary pump unit 10.

In the embodiment of the invention, the one-piece main mounting block 1 includes a thin portion 19 in which a space 21 is provided for receiving a gas analyzer of the magnetic mass spectrometer type. Since the one-piece main mounting block 1 is advantageously made of a non-magnetic material, the magnet 40 required for the magnetic mass spectrometer 4 to operate properly is integrated by straddling the thin portion 19.

In the invention, the leak detector includes a one-piece test and calibration mounting block 2 provided with:

bored ducts 18 forming some of said link segments 14 and some of the casings of the valves of the test module 8 and of the calibration module 9;

a pressure gauge 50; and block inlets and outlets 36 coming into register with the corresponding block outlets and inlets 36 of the main mounting block 1.

In the invention, the leak detector includes a one-piece delivery mounting block 3 provided with:

bored ducts forming some of said link segments 14 and some of the casings of said valves $V_2$, 13 of the delivery module 12 of the secondary pump unit; and block inlets and outlets 37 coming into register with the corresponding block outlets and inlets 37 of the main mounting block 1, or delivery outlets 33 of the turbomolecular pumps 6, 7.

The one-piece mounting blocks of the invention may be manufactured using any existing method, in particular by machining or molding, or a combination thereof.

Naturally, the invention is not limited to the embodiment described and shown, but quite numerous variants accessible to the person skilled in the art are possible without going beyond the invention.

What is claimed is:

1. A leak detector, comprising:

a primary pump unit;

a secondary pump unit having at least one secondary pump, said primary pump unit connected to said secondary pump so as to maintain a vacuum in said secondary pump unit;

a gas analyzer connected to said secondary pump so said secondary pump provides a vacuum to said gas analyzer;

a test module;

a calibration module to calibrate said gas analyzer;

a delivery module of the secondary pump unit;

valves to, and link segments to connect at least two of any of the above components, wherein said leak detector includes a one-piece main mounting block provided with spaces making it possible to integrate at least one of the component elements of the leak detector, and wherein the one-piece main block is provided with:

a bore forming the casing for the stator of said secondary pump;

a space forming a casing for the gas analyzer;

bored ducts forming at least one of said link segments and at least one of the casings of said valves; and block inlets and outlets making it possible to connect the integrated components to the other component elements of the leak detector.

2. A leak detector according to claim 1, wherein the secondary pump unit comprises a turbomolecular pump that has a stator casing constituted by a bore in said main mounting block.

3. A leak detector according to claim 1, wherein the primary pump unit comprises a turbomolecular pump in series with a primary pump, said turbomolecular pump having a stator casing constituted by a bore in said main mounting block.

4. A leak detector according to claim 1, wherein the gas analyzer is of the magnetic mass spectrometer type, the main mounting block having a non-magnetic thin portion in which a space is provided for receiving the magnetic mass spectrometer, a magnet being integrated by straddling said thin portion.

5. A leak detector according to claim 1, including a one-piece delivery mounting block provided with:
    bored ducts forming at least one of said link segments and at least one of the casings of said valves of the delivery module of the secondary pump unit; and
    block inlets and outlets coming into register with the corresponding block outlets and inlets of the main mounting block.

6. A leak detector according to claim 1, including a one-piece test and calibration mounting block provided with:
    bored ducts forming at least one of said link segments and at least one of the casings of said valves of the test module and of the calibration module; and
    block inlets and outlets coming into register with the corresponding block outlets and inlets of the main mounting block.

7. A leak detector according to claim 1, wherein the one-piece mounting blocks are molded blocks.

8. A leak detector according to claim 1, wherein the one-piece mounting blocks are machined blocks.

9. A leak detector comprising the following component elements:
    a primary pump unit;
    a secondary pump unit having at least one secondary pump;
    a gas analyzer;
    a test module;
    a calibration module;
    a delivery module of the secondary pump unit;
    valves having a casing;
    link elements, wherein said link elements connecting together all the other component elements, and
    wherein said leak detector including a one piece main mounting block provided with:
        a bore forming the casing for the stator of said secondary pump;
        the space forming a casing for the gas analyzer;
        bored ducts forming link segments and casings of said valves; and
        block inlets and outlets making it possible to connect the integrated components to the other component elements of the leak detector.

* * * * *